United States Patent [19]
Vogel

[11] Patent Number: 6,098,303
[45] Date of Patent: Aug. 8, 2000

[54] VARIABLE ANGLE SQUARING ACCESSORY FOR TAPE MEASURES

[76] Inventor: Stanley Vogel, P.O. Box 50005, Reno, Nev. 89513

[21] Appl. No.: 09/177,784

[22] Filed: Oct. 22, 1998

[51] Int. Cl.⁷ .................................................. G01B 3/10
[52] U.S. Cl. .................................. 33/770; 33/759; 33/768
[58] Field of Search .............................. 33/759, 755, 761, 33/768, 770, 474, 481, 760, 769, 451

[56] References Cited

U.S. PATENT DOCUMENTS

| | | |
|---|---|---|
| D. 300,516 | 6/1986 | Foster . |
| 4,106,201 | 8/1978 | Hansen . |
| 4,908,954 | 3/1990 | Johnson .................................... 33/768 |
| 4,965,944 | 10/1990 | Kuze et al. . |
| 5,062,215 | 11/1991 | Schlitt ...................................... 33/759 |
| 5,113,596 | 5/1992 | Meyers . |
| 5,231,769 | 8/1993 | Mahan ..................................... 33/759 |
| 5,333,391 | 8/1994 | Eldridge et al. .......................... 33/768 |
| 5,481,810 | 1/1996 | Hastings et al. . |
| 5,671,543 | 9/1997 | Sears . |
| 5,809,662 | 9/1998 | Skinner .................................... 33/770 |

Primary Examiner—Christopher W. Fulton
Assistant Examiner—Quyen Doan
Attorney, Agent, or Firm—Ian F. Burns

[57] ABSTRACT

A straight edge device for use with a conventional tape measure having an extensible tape. The straight edge device comprises a perimeter molding, a straight edge device, and an edge guide. The perimeter molding abuts perimeter surfaces on the tape measure and supports the straight edge and edge guide. The edge guide is adapted to abut a first surface on an object and align the straight edge a predetermined angle from the first surface. The straight edge may then be used to mark a line on a second surface of the object. An angle scale may also be provided for indicating a variety of angles to which the straight edge may be positioned relative to the first surface. One or more clip tabs may be provided for attaching the straight edge device to the tape measure.

17 Claims, 3 Drawing Sheets

FIG. 4B
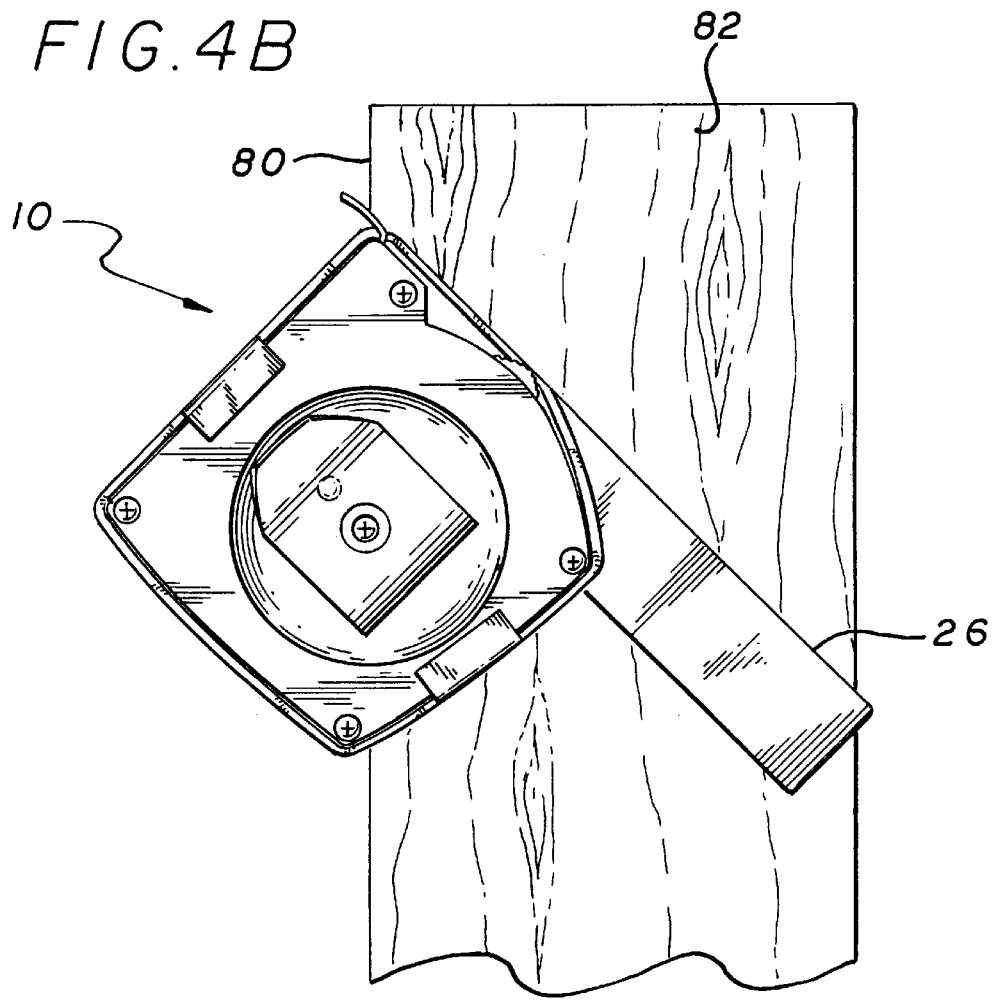
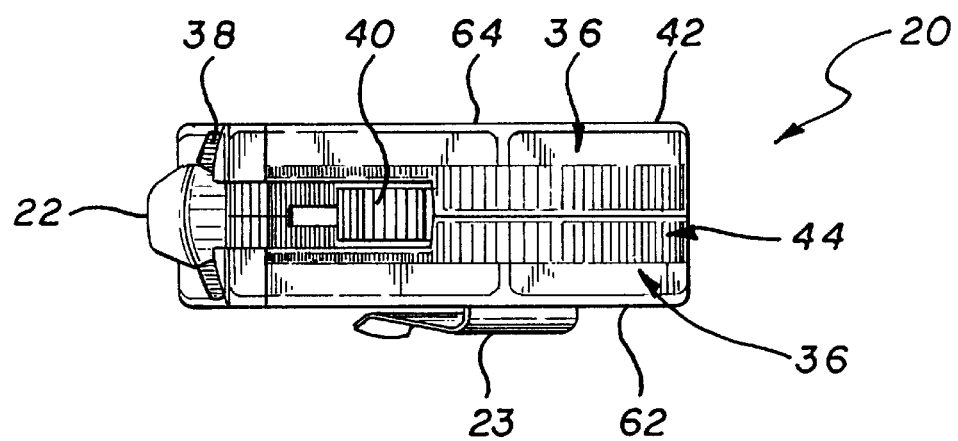
FIG. 5

VARIABLE ANGLE SQUARING ACCESSORY FOR TAPE MEASURES

BACKGROUND OF THE INVENTION

1. Field of Invention

This invention relates to tape measures, more specifically to a straight edge or T-square attachment device designed for use with a standard tape measure to assist in the framing of conventional stud walls and a variety of construction applications.

2. Description of Related Art

Tape measures and T-squares are commonly used by carpenters to make accurate measurements on pieces of lumber. The importance of accurate measurements is instantly recognizable, and therefore of great concern when building a stable structure. Typically, carpenters must first measure the object to be marked and thereafter use a different tool, a T-square or a protractor, to sketch a line at a desired angle. This is of course, an efficient method of marking an object. Thus, the need for a combined tape measure and T-square tool has given rise to the present invention - an attachable T-square for use with a conventional tape measure having a scale for determining a variety of angles.

Accordingly, combined tools like the one described above have been previously attempted. For example, U.S. Pat. No. 5,671,543 to Sears proposes a pivotally attached marking or cutting device for a tape measure. Hastings, U.S. Pat. No. 5,481,810, proposes a removably attachable right triangle. However, while both of the previous devices do provide means for marking an object, neither offers a method for measuring angles.

A T-square accessory is proposed by Meyers, U.S. Pat. No. 5,113,596, wherein a T-square is offered as a complement to a standard tape measure. However, there are several disadvantages to Meyers, which the present invention overcomes. As an example, Meyers does not provide a compact T-square accessory because of the shape and position of the straight edge portion; attaching a device to a belt or a carpenter's apron would be very awkward. The present invention has the straight edge in a more convenient location and thus overcomes this fault. Additionally, Meyers does not offer any means for measuring and marking a variety of angles.

U.S. Pat. No. 4,965,944 to Kuze et al. appears to disclose a tape measure casing having an angle scale for measuring and marking a range of angles. This device does not incorporate a T-square and, by virtue of its design, eliminates access to the carrying clip, thereby denying the user a method of transporting it except by carrying it in a hand or by placing it in a pocket.

Lastly, U.S. Pat. No. 4,106,201 to Hansen proposes a case for a standard tape measure having a pivotally attached retractable square blade structure. This device is capable of marking a line perpendicular to the longitudinal axis of the marking tape, but has no means for determining other angles.

Thus, the foregoing devices fail to teach or suggest a variable angle T-square and tape measure apparatus which has the following combination of desirable features: (1) provides a compatible combination of both a tape measure and a T-square; (2) permits convenient attachment and detachment of the T-square apparatus from the tape measure; (3) permits the use of a conventional tape measure; (4) permits the tape measure to be used without interference from the T-square; and (5) allows various predetermined angles to be measured and marked.

SUMMARY OF THE INVENTION

Objects of the Invention

Accordingly, besides the objects and advantages of the combination tape measure, T-square described above, the objects and advantages of the present invention include:

(a) to provide a tool that combines a T-square and a standard tape measure;

(b) to provide a tool that has means for accurately measuring and marking various angles;

(c) to provide a tool that may be easily clipped onto a belt or a carpenter's apron;

(d) to provide a tool that can be used in conjunction with a conventional tape measure;

(e) to provide a tool that is durable and light weight;

(f) to provide a tool that is compact enough to be unobtrusive; and (g) to provide a multi-purpose tool that obviates the need for multiple tools when measuring distances and angles on objects.

Further objects and advantages are to provide a tool that can be used quickly and easily to measure and mark various angles at various points on an object, that is simple to use, inexpensive to manufacture, and that is easily attachable/detachable from a conventional tape measure. Still further objects and advantages will become apparent from a consideration of the ensuing description and drawings.

BRIEF DESCRIPTION OF THE INVENTION

In accordance with the above objects, a straight edge device is provided. The device is intended for use with a tape measure with an extensible measuring tape and a casing, the casing having first and second longitudinal sides and lateral peripheral surfaces. The device comprises a perimeter molding adapted to abut the peripheral surfaces of the tape measure and receive the tape measure therein; a straight edge attached to the perimeter molding and positioned substantially parallel to the first and second longitudinal sides of the tape measure; and an edge guide attached to the perimeter molding, the edge guide being adapted to abut a surface of an object and to align the straight edge a predetermined angle from a plane defined by the surface.

The above description sets forth, rather broadly, the more important features of the present invention so that the detailed description of the preferred embodiment which follows may be better understood and contributions of the present invention to the art may be better appreciated. There are, of course, additional features of the invention that will be described below and which will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 4B is substantially a side elevational view of the straight edge device and tape measure of the present invention positioned to draw an obtuse angle line on a board.

FIG. 5 is substantially a perspective view of a tape measure that may be used with the present invention taken along line 5—5 in FIG. 2.

Figure 1:
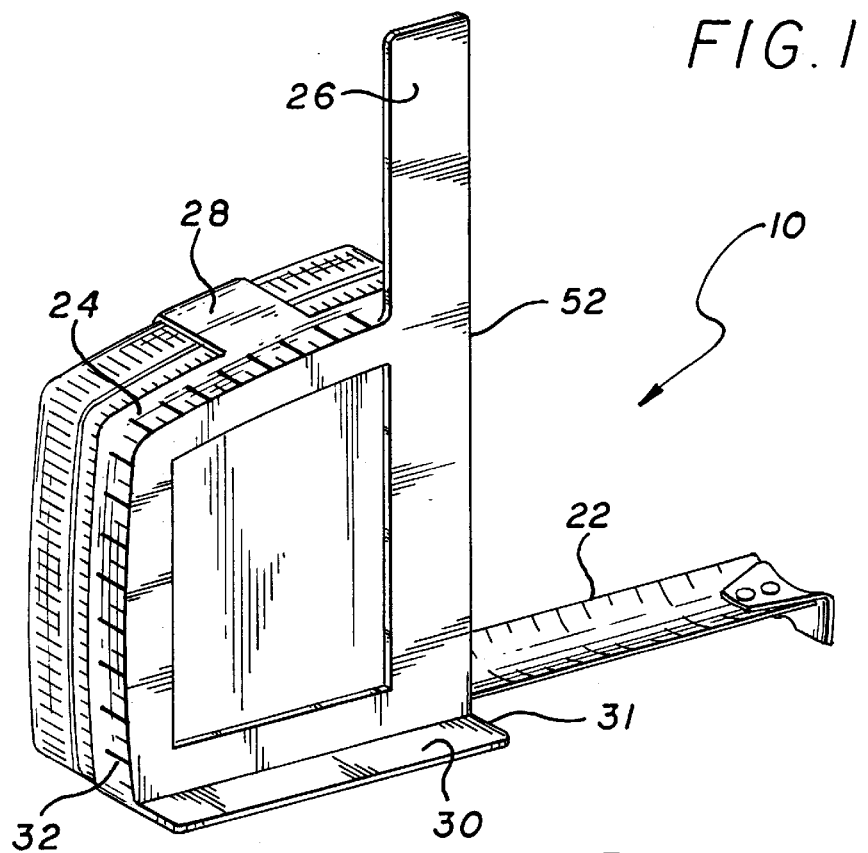
FIG. 1 is substantially a side perspective view of the straight edge device and tape measure of the present invention.

REFERENCE NUMERALS IN DRAWINGS 10 combination tape measure and T-square tool
15 squaring accessory
20 tape measure
22 extensible tape
23 clip
24 perimeter molding
25 indentation
26 rigid planar member
28 clip tabs
30 footing member
31 edge guide
32 angle scale
36 measure casing
38 tape exit
40 tape arresting means
42 lateral edge of measure casing
44 narrow dimension of measure
46 object
48 pivot point
50 proximal edge of object
52 leading edge of planar member
62 side
64 side
66, 68, 70, 72 peripheral surface
80 first surface
82 second surface
84 board

DESCRIPTION OF THE PREFERRED EMBODIMENT

The preferred embodiment of the present invention is illustrated in FIGS. 1-4. The present invention comprises a straight edge device generally indicated by reference number 10. In the preferred embodiment, device 10 is constructed from injection molded plastic. However, many other materials are equally suitable. These materials include but are not limited to vinyl, plastic, PVC, and other various synthetic or plasticized materials, metal, and various laminated materials.

Figure 2:
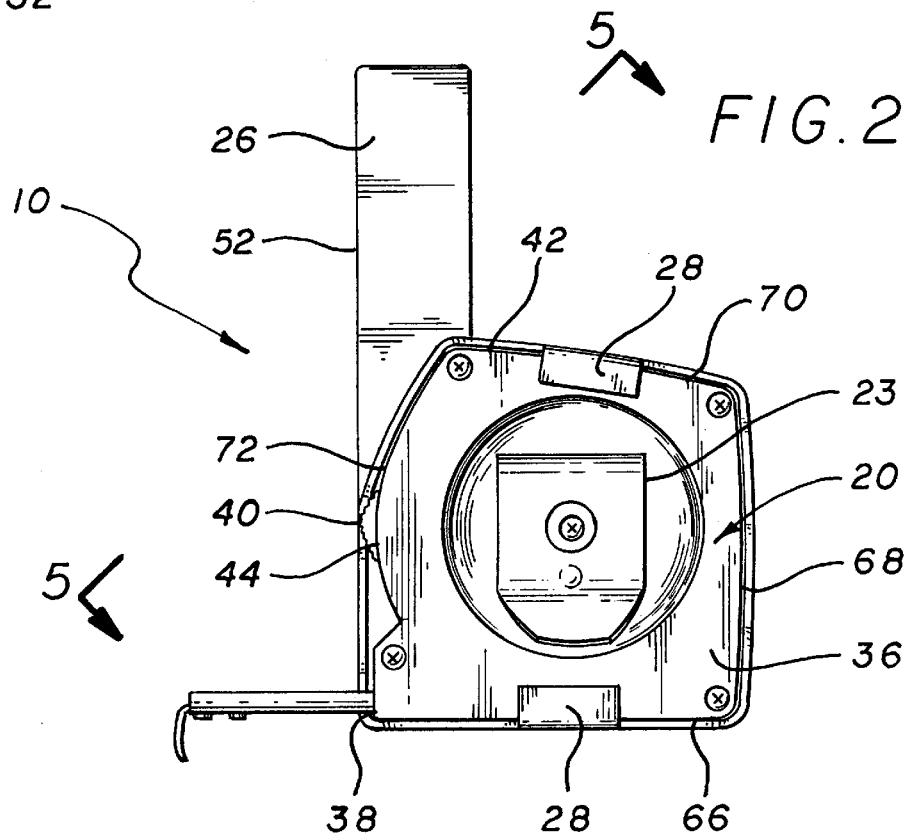
FIG. 2 is substantially a side elevational view of the straight edge device and tape measure of the present invention.

Device 10 is adapted to be used with a tape measure 20. As seen in FIGS. 2 and 5, tape measure 20 may be any of a large number of tape measures that are widely available in the carpentry, construction, and tool industries. Tape measure 20 includes a tape 22 with measurement marking that is adapted to be coiled within a casing 36 when stored and may be extended out of the casing when needed. Clip 23 is provided to clip the tape measure to an object, such as a belt or a carpenter's apron. A user may operate tape measure 20 by extending tape 22 by pulling on it directly or by hooking it to an object and pulling the tape measure away from the object. The user may engage a brake actuator 40 to lock tape 22 in an extended position and the user may measure and mark a desired dimension on an object or board. Casing 36 comprises longitudinal sides 62 and 64 and lateral peripheral surfaces 66, 68, 70, and 72. Longitudinal sides 62 and 64 are substantially parallel to the longitudinal axis of tape 22 when it is extended and lateral peripheral surfaces 66, 68, 70, and 72 are substantially parallel to the lateral axis of the tape. Tape opening 38 is provided for allowing tape 22 to extend out of casing 36.

Figure 3:
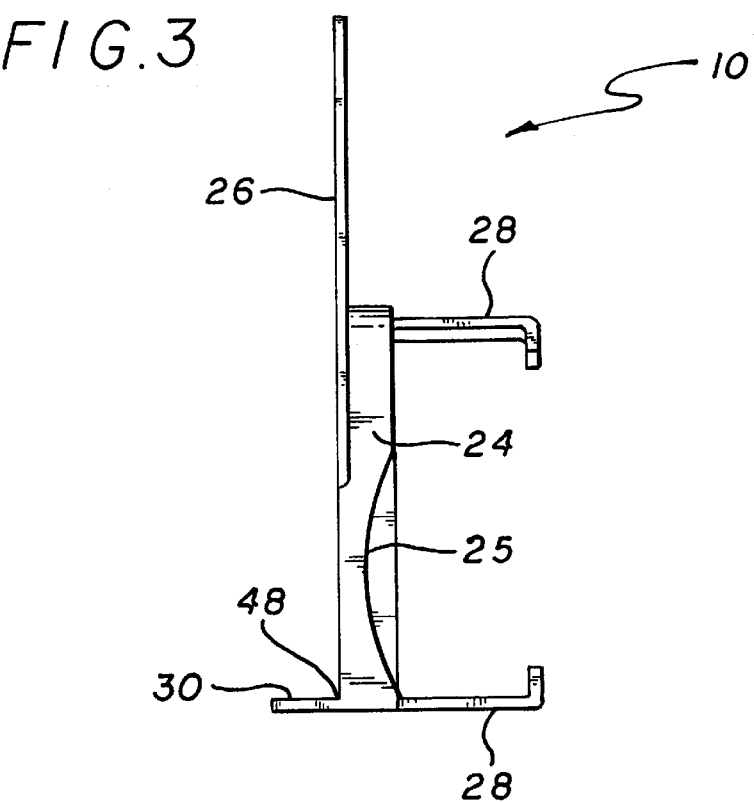
FIG. 3 is substantially a front elevational view of the straight edge device of the present invention.

Turning to FIGS. 1, 2, and 3, device 10 comprises a perimeter molding 24, a straight edge 26, an edge guide 30, and an angle scale 32. Perimeter molding 24 is adapted to substantially match the shape or contour of perimeter surfaces 66, 68, 70, and 72 of tape measure 20. This allows molding 24 to receive tape measure 20 on one side of the tape measure. In the preferred embodiment, perimeter molding 24 engages tape measure 20 on side 64 so that clip 23 may be used to clip the tape measure to another object without interference from device 10. Perimeter molding 24 may completely cover peripheral surfaces 66, 68, 70, and 72 or it may partially cover the surfaces. As seen in FIG. 3, perimeter molding 24 may have an indentation 25 that allows a user to more easily operate brake actuator 40. In the preferred embodiment, molding 24 extends around an edge 42 of casing 36 (see FIG. 5) so that the molding abuts both peripheral surfaces 66, 68, 70, and 72 and side surface 64.

Straight edge 26 and edge guide 30 comprise the T-square portion of device 10. Straight edge 26, preferably five to six inches long, is attached to perimeter molding 24 and extends upward away from edge guide 30 in a right angle. In the preferred embodiment, when device 10 is engaged with tape measure 20, straight edge 26 is substantially parallel to sides 62 and 64 and extends above perimeter surface 70 of the tape measure. Edge guide 30 is substantially parallel to perimeter surface 66 of the tape measure and is substantially as long as the surface. The positioning of straight edge 26 and edge guide 30 in this way prevents these elements from interfering with a user while tape measure 20 and device 10 are clipped on a belt or other object. Clip 23 may be used to attach tape measure 20 to an object and straight edge 26, being parallel to sides 62 and 64, does not poke or prod the user. This is contrary to the teachings of U.S. Pat. No. 5,113,596 to Meyer, which positions the straight edge in the same plane as the lateral surfaces of the tape measure. The preferred position of straight edge 26 also provides a high degree of convenience for the user. After the user has measured a dimension along an object, such as a board, the user need only rotate tape measure 20 and device 10 along the longitudinal axis of tape 22 to place straight edge 26 in a position where the user may draw a line across the object with a marking instrument.

Figure 4A:
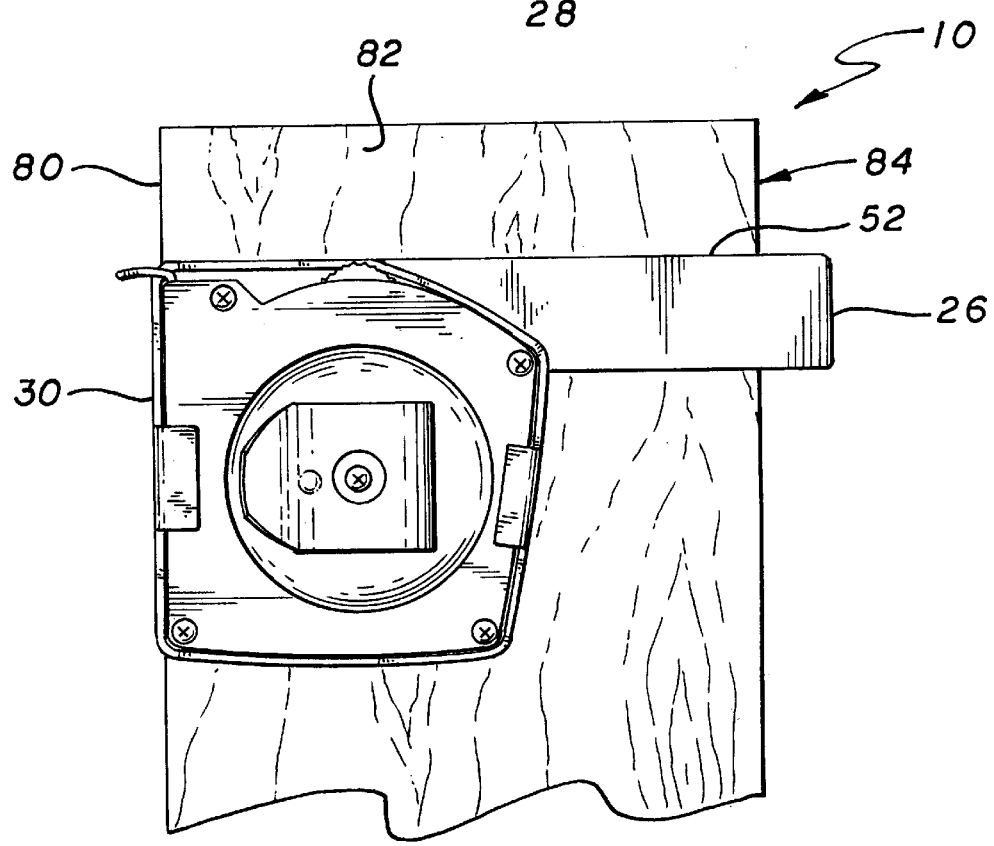
FIG. 4A is substantially a side elevational plan view of the straight edge device and tape measure of the present invention positioned to draw perpendicular line on a board.

As seen in FIG. 4A, straight edge 26 and edge guide 30 are normally used by placing edge guide 30 on a first surface 80 of a board 84 and placing straight edge 26 flat against a second surface 82 of the board. In most cases, surfaces 80 and 82 will define planes that are substantially perpendicular to each other. Edge 52 may then be used as a guide to draw a straight line across second surface 82. If edge guide 30 is placed flat against first surface 80, straight edge 26 will be substantially 90 degrees from the plane defined by the first surface.

However, device 10 is not limited to determining only right angles. Device 10 comprises angle scale 32, located on the portions of molding 24 that abut perimeter surfaces 68 and 70 of tape measure 20, that may be used to measure an infinite number of angles. As seen in FIG. 4B, this is performed by placing edge guide 30 against first surface 80 of board 84 and then pivoting device 10 around and axis defined by edge 31 of edge guide 30. In other words, device 10 is rotated while edge 31 is held against first surface 80. To determine the angle, one need only align the desired angle measure on angle scale 32 with surface 80.

Clip tabs 28 may be provided for securing device 10 to tape measure 20. In the preferred embodiment, there are two tabs 28—one located substantially on the upper portion of perimeter molding 24 and one located substantially on the lower portion of molding 24. Clip tabs 28 extend across the perimeter surfaces of tape measure 20 and terminate in hooks, the hooks being able to effectively secure device 10 to the tape measure. In an alternative embodiment, clip tabs 28 may be omitted and perimeter molding 24 may be fashioned so that friction holds device 10 and tape measure 20 together. In other embodiments adhesives and/or fasteners, such as screws, are used to hold the two objects together.

SUMMARY

Additional advantages may be realized by reference to the previous specification and to the ensuing claims. Further, the above description and specification should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A straight edge device for use with a tape measure having an extensible measuring tape and a casing, the casing having first and second longitudinal sides and lateral peripheral surfaces, comprising:
    (A) a perimeter molding, said perimeter molding being adapted to abut continuously the entire peripheral surfaces of the tape measure and receive the tape measure therein;
    (B) a straight edge attached to said perimeter molding, said straight edge being positioned substantially parallel to the first and second longitudinal sides of the tape measure; and
    (C) an edge guide attached to said perimeter molding, said edge guide being adapted to abut a surface of an object and to align said straight edge a predetermined angle from a plane defined by the surface.

2. The device of claim 1 further comprising an angle scale on said perimeter molding, said angle scale being adapted to allow a user to align said straight edge in at least one predetermined angle with the plane.

3. The device of claim 1 wherein said device comprises injection molded plastic.

4. The device of claim 1 further comprising at least one clip tab, said clip tab being adapted to attach said device to the tape measure.

5. The device of claim 1 wherein said perimeter molding is attached to said tape measure by friction.

6. The device of claim 1 wherein said edge guide forms a substantially right angle with said straight edge.

7. A method of marking a line on an object comprising the following steps:
    (A) providing a tape measure, the tape measure comprising:
        (a) an extensible measuring tape; and
        (b) a casing, the casing having first and second longitudinal sides and lateral peripheral surfaces;
    (B) providing a straight edge device, the device comprising:
        (a) a perimeter molding, the perimeter molding being adapted to continuously abut the entire peripheral surfaces of the tape measure and receive the tape measure therein;
        (b) a straight edge attached to the perimeter molding, the straight edge being positioned substantially parallel to the first and second longitudinal sides of the tape measure; and
        (c) an edge guide attached to the perimeter molding, the edge guide being adapted to abut a surface of an object and to align the straight edge a predetermined angle from a plane defined by the surface;
    (C) attaching the device to the tape measure.

8. The method of claim 7 further comprising the step of extending the tape measure to measure a dimension on the object.

9. The method of claim 7 further comprising the step placing the edge guide on a first surface and marking a line on the object using the straight edge as a guide.

10. The method of claim 9 wherein the device further comprises an angle scale on the perimeter molding, the method further comprising the step of rotating the device and tape measure to align the angle scale with the first surface.

11. The method of claim 10 wherein the device and tape measure are rotated around an axis defined by an edge on the edge guide.

12. A combination a tape measure and straight edge for marking a line on an object, comprising:
    (A) a tape measure, the tape measure comprising:
        (a) an extensible measuring tape; and
        (b) a casing, the casing comprising:
            (i) first and second longitudinal sides; and
            (ii) lateral peripheral surfaces; and
    (B) a straight edge device, comprising:
        (a) a perimeter molding, said perimeter molding being adapted to continuously abut said entire peripheral surfaces of said tape measure and receive said tape measure therein;
        (b) a straight edge attached to said perimeter molding, said straight edge being positioned substantially parallel to said first and second longitudinal sides of said tape measure; and
        (c) an edge guide attached to said perimeter molding, said edge guide being adapted to abut a surface of the object and to align said straight edge a predetermined angle from a plane defined by the surface.

13. The combination tape measure and straight edge of claim 12 wherein said straight edge device further comprises at least one clip tab, said clip tab being adapted to attach said straight edge device to said tape measure.

14. The combination tape measure and straight edge of claim 12 wherein said straight edge device further comprises an angle scale, said angle scale being adapted to indicate at least one angle for positioning said straight edge relative to the surface.

15. The combination tape measure and straight edge of claim 12 wherein said perimeter molding comprises an indentation, said indentation being adapted to allow a user to operate a brake actuator on said tape measure.

16. The combination tape measure and straight edge of claim 12 wherein said perimeter molding is adapted to provide a friction fit for attaching said straight edge device to said tape measure.

17. The combination tape measure and straight edge of claim 12 wherein said straight edge device comprises injection molded plastic.

* * * * *